March 1, 1938.   W. O. WILLISON ET AL   2,109,560
HAMBURGER DISPENSER
Filed Sept. 25, 1937

INVENTORS.
William O. Willison and John L. Nilson
BY James R. McKnight
ATTORNEY.

Patented Mar. 1, 1938

2,109,560

UNITED STATES PATENT OFFICE 2,109,560

HAMBURGER DISPENSER

William O. Willison and John L. Nilson, Chicago, Ill.

Application September 25, 1937, Serial No. 165,780

1 Claim. (Cl. 312—116)

This invention relates to a unit for completely and sanitarily displaying, refrigerating, grinding meat and cooking hamburgers in full view of consumers.

Among the objects of our invention is to create a unit in which meat for hamburgers is displayed in a refrigerator having glass windows in full view of the public; said refrigerator housing a grinding machine, so that a consumer may see the meat displayed in the refrigerator and may also see the same meat ground in the refrigerator by a refrigerated grinder before his eyes. Then still in full view of the consumer the ground meat is placed on the cooking parts of the unit and cooked to the consumer's taste. All of these steps take place before the consumer without the attendant even leaving the unit to go into a back room for purposes of substitution or other duties, and such other objects, advantages and capabilities as will later more fully appear and which are inherently possessed by our invention.

While we have referred herein to a preferred embodiment of our invention, yet we wish it understood that the same is susceptible of modification and change without departing from the spirit of our invention.

Figure 1:
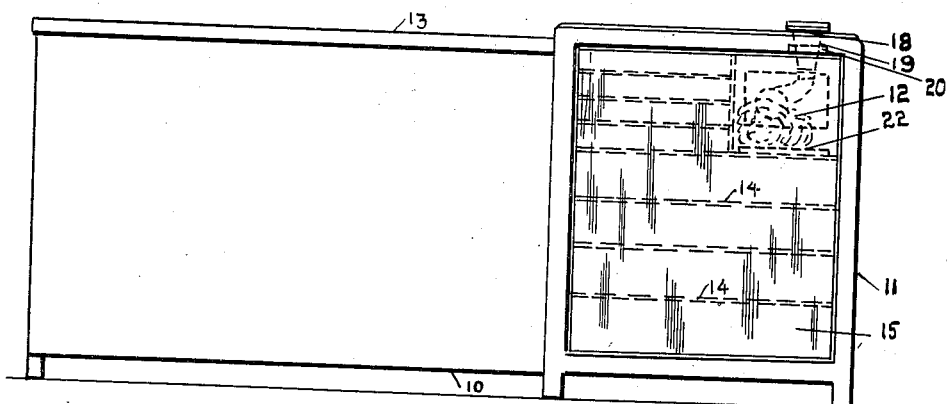
Figure 2:
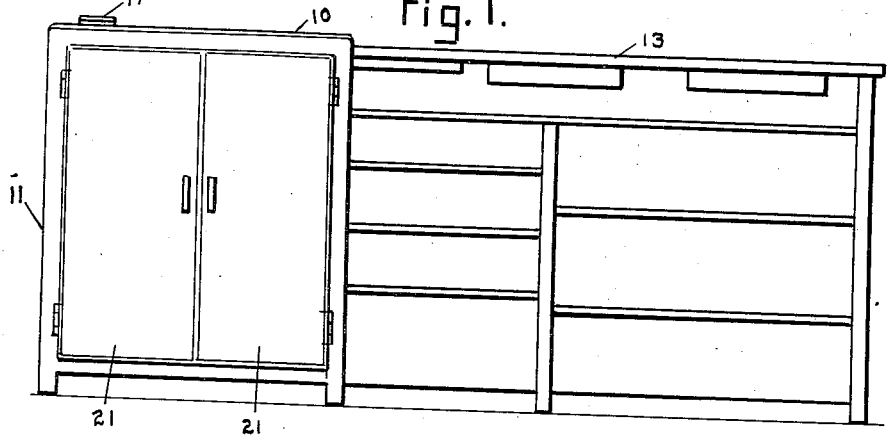
Figure 3:
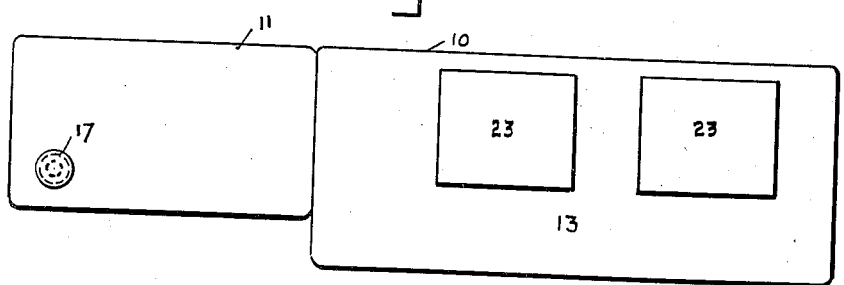

Referring to the drawing, Fig. 1 is a front, Fig. 2 is a rear and Fig. 3 is a plan view of a unit embodying our invention.

Referring to the embodiment selected to illustrate our invention, it comprises a unit 10 having as parts thereof a refrigerator 11, a grinder 12, and a cooking portion 13. The refrigerator 11 cooled by any suitable means such as coils, ice or the like has a plurality of shelves 14 for holding pieces of meat. The front of the refrigerator 11 has a glass window 15 through which the meat and the entire inside of the refrigerator may be seen. Other sides of the refrigerator may also have windows for increasing visibility. Adjacent one of the upper corners and resting on one of the shelves 14 of the refrigerator is the grinder 12. Preferably at the top of the refrigerator 11 is a normally closed and insulated closure 17 which when opened exposes a funnel 18 integrally formed from the walls of the refrigerator 11 to form a substantially air tight connection therewith and leading to the mouth 19 of the grinder 12 so as to prevent the leakage of cold air from the refrigerator during the time that the cap 17 is open and meat is being fed to the funnel to be ground by the grinder.

To aid in obtaining a substantially perfect seal between the funnel 18 and the mouth 19 of the grinder 12 we prefer to use a gasket 20 removably held by the refrigerator so that when the grinder is removed for cleaning the gasket remains with the funnel and can be removed therefrom by the operator.

The rear of the refrigerator may have doors 21 to swing open for placing and removing meat from the shelves, and for general access to the grinding machine and parts of the refrigerator.

A plate 22 may be positioned below the exit of the grinding rack to receive the ground hamburger, so that the operator may remove the hamburger and place the same, still in view of the consumer, on the hot spots 23 of the cooking portion 13 of the unit.

In use a prospective customer is attracted by the display of the meat on the shelves of the refrigerator and his appetite is intrigued by the idea of a freshly ground hamburger. Immediately upon receipt of the customer's order, the operator opens the back door of the refrigerator, removes the refrigerated meat, opens the cap on the top of the refrigerator, drops the meat into the funnel and into the refrigerated grinding machine which grinds the meat cold and fresh, to be removed and cooked on the hot spots of applicants' unit. The operator does not leave the unit. It is all done before the customer who receives a fresh hamburger made before him from freshly ground meat from a refrigerated grinder.

While our device is particularly adapted to road side use, yet it may be incorporated in stores such as butcher shops, both with and without the cooking portion of the unit.

Having thus described our invention, we claim:

A combination meat and hamburger display, refrigerator and grinder unit comprising a refrigerator having a plurality of shelves for the storage of unground meat, a grinder positioned within said refrigerator and refrigerated thereby so as to receive and grind said unground meat in refrigerated condition, said grinder supported on one of said shelves, adjacent the upper portion of said refrigerator, a closure in the top of said refrigerator, a funnel leading from said closure to said grinder through which said unground meat may be fed to said grinder without the body of the operator entering the refrigerator, the front of said refrigerator having glass windows so that the inside of said refrigerator with the grinder and meat first unground and later ground by the grinder is visible from the outside to prospective purchasers of hamburgers.

WILLIAM O. WILLISON.
JOHN L. NILSON.